United States Patent [19]

Harvey

[11] Patent Number: 5,590,022
[45] Date of Patent: Dec. 31, 1996

[54] SHIELDED MODULAR PORTABLE COMPUTER WORK STATION HAVING CABLE ROUTING MEANS

[75] Inventor: Stephen Harvey, Las Cruces, N.M.

[73] Assignee: The I.D.E.A. Corporation, Las Cruses, N.M.

[21] Appl. No.: 444,704

[22] Filed: May 19, 1995

[51] Int. Cl.⁶ .................................. G06F 1/16; H05K 5/02
[52] U.S. Cl. ............................................ 361/683; 206/576
[58] Field of Search ............................. 206/320, 576, 206/305; 361/683, 679, 680, 681, 682, 684, 685, 686, 724–730; 364/708.1; 400/88, 691; G06F 1/16

[56] References Cited

U.S. PATENT DOCUMENTS

| | | | |
|---|---|---|---|
| 4,837,590 | 6/1989 | Sprague | 346/145 |
| 4,896,776 | 1/1990 | Kabanuk et al. | 206/576 |
| 5,212,628 | 4/1993 | Bradbury | 361/683 |
| 5,214,574 | 5/1993 | Chang | 361/683 |
| 5,242,056 | 9/1993 | Zia et al. | 206/576 |
| 5,442,512 | 8/1995 | Bradbury | 361/683 |

*Primary Examiner*—Leo P. Picard
*Assistant Examiner*—Lynn D. Feild
*Attorney, Agent, or Firm*—Hawes, Fischer & Dickinson

[57] ABSTRACT

A compact modular portable work station including a computer, a printer and/or other peripherals, efficiently interconnected with one another with conductors enclosed in a single, shielded composite cable supported by a docking channel having electrical connectors extending therefrom to be connected directly to the computer and the peripheral, all operational from and efficiently packaged within an impact resistant carrying case. Loose, unshielded cables are eliminated and a cellular telephone is placed in a shielded enclosure, under a metal shroud, in order to shield the user and the work station computer and computer peripherals from RF signals emitted by the cellular telephone.

20 Claims, 4 Drawing Sheets

SHIELDED MODULAR PORTABLE COMPUTER WORK STATION HAVING CABLE ROUTING MEANS

BACKGROUND OF THE INVENTION

1. Field of the Invention

This invention relates generally to the field of modular portable work stations. In particular, this invention relates to a compact modular portable work station including a computer, a printer and/or another computer peripheral interconnected with one another by conductors enclosed in a shielded composite cable and routed through a docking channel having electrical connectors extending therefrom to be connected directly to the computer and at least one peripheral.

2. Brief Description of the Prior Art

Compact portable offices containing a computer, a printer and other peripheral devices, packaged within a carrying case, have been developed and commercially available for several years. Because of space constraints, the user is often required to remove either the computer or the printer from the case before access can be gained to each. In certain situations, a printer and other conventional peripherals can not be easily packaged within the same carrying case, making it necessary for the operator to have access to an external printer and/or the other computer peripherals.

The versatility of some conventional portable offices is also limited because the computer and all of the peripherals are not always controllable from the carrying case. More particularly, external sources of power, telephone receptacles, and the like, are sometimes necessary before the office can be made fully operational. Further, some portable offices do not permit a user to selectively operate the computer and the peripherals from a readily accessible and easy to operate master control panel.

The portable work stations known to the applicant include a common shortcoming in that the cables which interconnect the computer with its peripherals are not fixed within the carrying case. Therefore, opening and closing the case is sometimes difficult and the cables often stick out between the lid and the case body, making the connections less reliable and difficult to use. Moreover, the cables are typically not shielded, making the system undesirably sensitive to noise emission. Further, the hardware components within the carrying case have to be connected to many separate cables, at least one cable for each component, and time must be spent to insure that the cables and connectors are correctly mated together.

What is more, The Federal Communications Commission (FCC) has adopted the standard for safety levels of radio frequency (RF) emission from computer and communication devices, to avoid the undesirable and harmful emission of radio frequency (RF) energy as well as for protection against interference with radio communications. Therefore, to insure compliance with RF emission limits established by the government, shielded interconnect cables and shielded power cords must be employed. Moreover, cellular telephone equipment must be arranged in a separate, protective case to limit RF exposure by shielding the computer and peripheral devices from sources of RF energy.

One example of a modular portable work station is described in U.S. Pat. No. 5,212,628 issued to George M. Bradbury on May 18, 1993 and assigned to the assignee of the present invention, the details of which are incorporated herein by reference and therefore will not be repeated. In this patented work station a self-contained data system is disclosed that is fully integrated with hardware conforming to the specific needs of the user while allowing for upgrade by exchange of either commercially available or custom-made devices.

SUMMARY OF THE INVENTION

It is an object of the present invention to provide a portable shielded modular work station which incorporates the needs of a mobile person for a lightweight portable office that is capable of performing some or all the functions normally done in a fixed office: taking digital photos, laser quality printing, hand scanning documents, sending and receiving facsimiles and data via a modem, and voice communications over cellular or land telephone.

The present invention relates to a portable work station which includes at least two separate cooperating units stored in a rigid carrying case including a cover and a body. The carrying case contains a notebook computer, a printer and/or other peripherals, and can be used on the road by salesman, executives, field engineers, repairmen and other field workers, for testing, ordering goods, office communications, document printing, etc. Such a work station is capable of withstanding impacts and other external forces. In addition, the work station can be carried on an airplane and be used in remote locations without the need for either power or land line telephone connection, since it combines battery-operated telecommunication and computer technologies found useful in military, transportation, insurance, real estate and other industries.

In general terms, the preferred embodiment of the present invention relates to a compact portable work station including a personal computer, a printer and/or other conventional peripherals, all interconnected with one another and efficiently packaged within and operational from an impact resistant carrying case. The computer may be interfaced with such peripherals as an optical scanner, a cellular telephone, a digital camera, a modem to permit facsimile and data transmission, and the like. A conductive (e.g., metal) shroud extends across the carrying case, and a main control panel is located atop the shroud. The main control panel includes a plurality of easily accessible switches that are manually operated to selectively energize the computer and one or more of the peripherals. Behind the shroud are located a computer and a peripheral, such as a printer. The computer can be placed on a computer tray that is connected to the bottom of the carrying case by a pair of arms. Opposite ends of the arms are pivotally connected to respective brackets at each of the computer tray and the bottom of the case.

The work station of the present invention complies with applicable RF safety standards and recommendations for protection of public exposure to RF electromagnetic energy established by the government. More particularly, the cellular telephone is located within a shielded enclosure under the metal shroud. In addition, the work station includes a hollow, elongated docking channel that supports and routs a shielded composite cable. Running through the shielded composite cable are power and communication conductors, each of which terminating at a respective electrical connector that extends through the docking channel and is adopted to be plugged directly into the computer and the peripheral devices enclosed in the work station carrying case.

Therefore, the computer and computer peripherals do not require many loose, space consuming cables, since they can be plugged directly into the connectors on the docking channel. By virtue of the foregoing, the work station will be shielded from RF energy sources, more compact in size, and user friendly.

The present invention solves the problems common to conventional work stations and provides an inexpensive means for providing a compact, shielded work station. In addition, the present invention provides an improved work station that allows different computer configurations to be directly plugged into electrical connectors, thus eliminating loose, unshielded cables. Further, the power and communication conductors are confined within a shielded composite cable to be neatly and efficiently routed to the computer and peripherals via the docking channel.

DESCRIPTION OF THE PREFERRED EMBODIMENT

Figure 1:
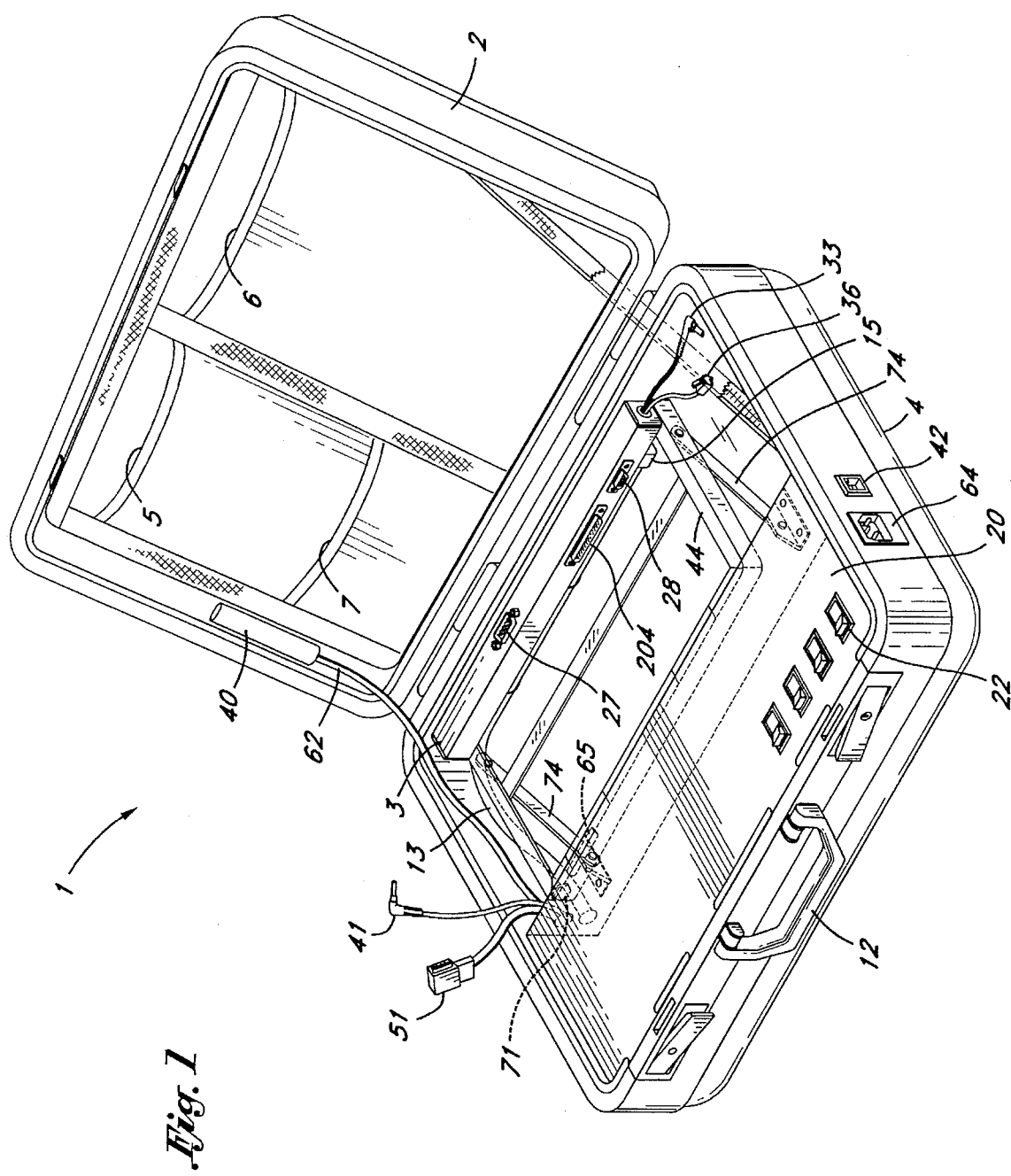
FIG. 1 is a perspective view of the modular portable work station of the present invention with the carrying case opened and the computer and peripherals removed therefrom.

The preferred embodiment of the invention will be described in conjunction with FIGS. 1–6 of the drawings. The present invention relates to a modular shielded portable work station, as illustrated in FIG. 1. A carrying case 1, coupled with a handle 12, is manufactured from an impact resistant material (e.g. ABS plastic), for convenient transport and storage of the work station. The carrying case 1 includes a cover 2, hingedly connected to a body 4, and adapted to rotate between opened and closed positions relative to the body 4.

Figure 2:
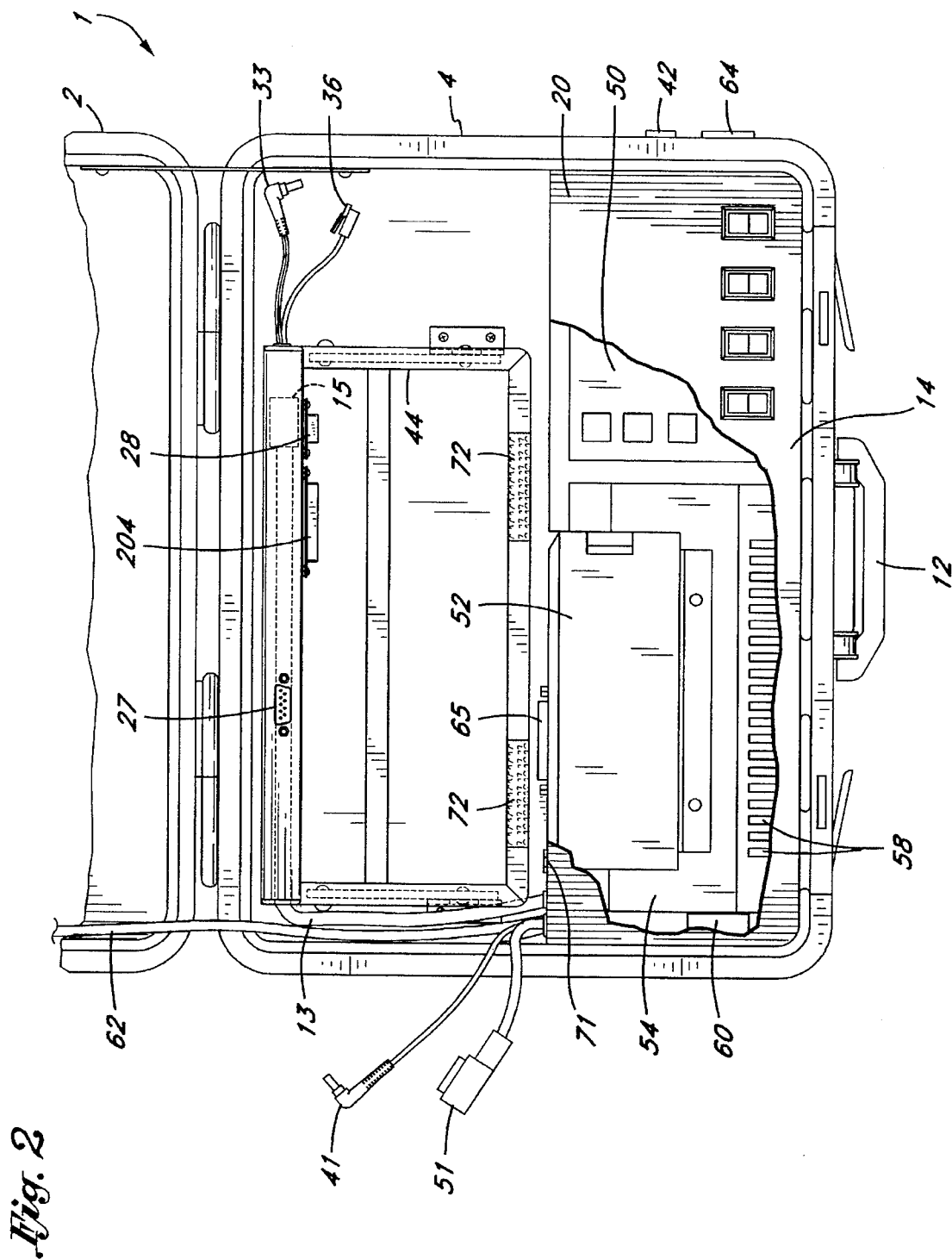
FIG. 2 is a top view of the carrying case of FIG. 1.

Located inside the cover 2 is a plurality of pockets and flaps 5–7 to store and carry a variety of common business and stationery articles, as well as a handset, not shown, for an optional cellular telephone 54 (best shown in FIG. 2) and an optical scanner, not shown. An antenna 40 is conveniently retained at the underside of the cover 2 of case 1 and interconnected with the cellular telephone 54, to enable suitable telephone and modem (e.g., facsimile) communications. An auxiliary telephone input receptacle 42, shown in FIG. 2, is located in the side of the body 4. Receptacle 42 is adapted to receive an external telephone connector, for modem or voice transmission, when it is not necessary or desirable to use the cellular telephone 54 of carrying case 1.

Figure 5:
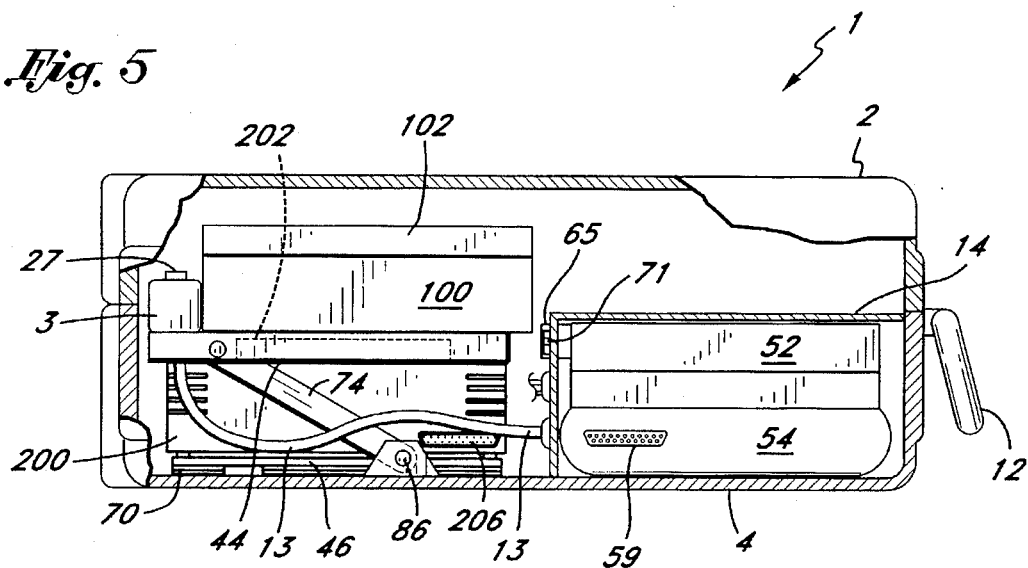
FIG. 5 is a side view of the carrying case with the computer and printer packaged therein.
Figure 6:
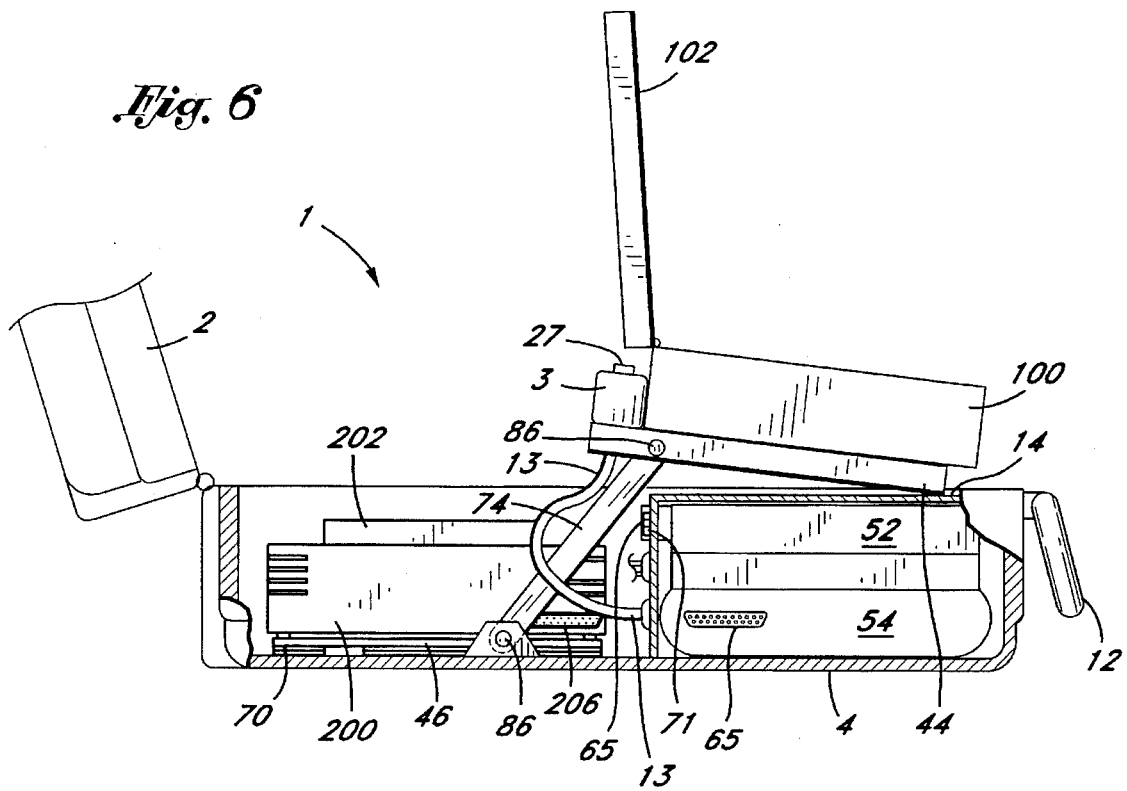
FIG. 6 is a side view of the carrying case showing the computer displaced therefrom.

As is best shown in FIGS. 2 and 5, a shroud or enclosure 14 extends across the front of the body 4 of carrying case 1 to surround a rechargeable conventional 12 Volt lead acid battery 52. The peripheral devices to be carried within the body 4 of case 1 and interfaced with a computer 100 may include a digital camera, not shown, the cellular telephone 54 having the associated handset, the optical scanner and other conventional peripherals. Located at the top and at one side of shroud 14 is a main control panel 20, including a plurality of function switches 22 to allow for power to be supplied from a source thereof to the electrical components of the work station. A computer tray 44, best illustrated in FIG. 6, is positioned in the rear and near the bottom of the body 4 of carrying case 1, and preferably manufactured of metal. The computer tray 44 supports the computer 100.

FIG. 2 of the drawings shows a main circuit board 50, located below the shroud 14 at the front of body 4, which contains the switching and power distribution electronics for controlling the operation of the portable work station in response to the activation of function switches 22 on main control panel 20, shown in FIG. 1.

Also located below the shroud 14 of body 4 in case 1 is the battery 52, mechanically connected to the top of shroud 14 by means of an L-shaped bracket, not shown. To promote an efficient and compact packaging of the work station, the battery 52 rests upon the cellular telephone 54 which is also disposed below shroud 14. The cellular telephone 54 includes the usual power connector 59, best shown in FIG. 5, and a series of cooling vents 58. Cellular telephone 54 also includes an antenna connector 60, best shown in FIG. 5, which communicates with the antenna 40, shown in FIG. 1 at the underside of the cover 2, by way of an antenna conductor 62. A DC input receptacle 64 is located in a side of body 4 to receive a 12 volt DC input signal from a suitable external voltage source. Located adjacent the DC input receptacle 64 is the telephone input receptacle 42, described above.

Figure 3:
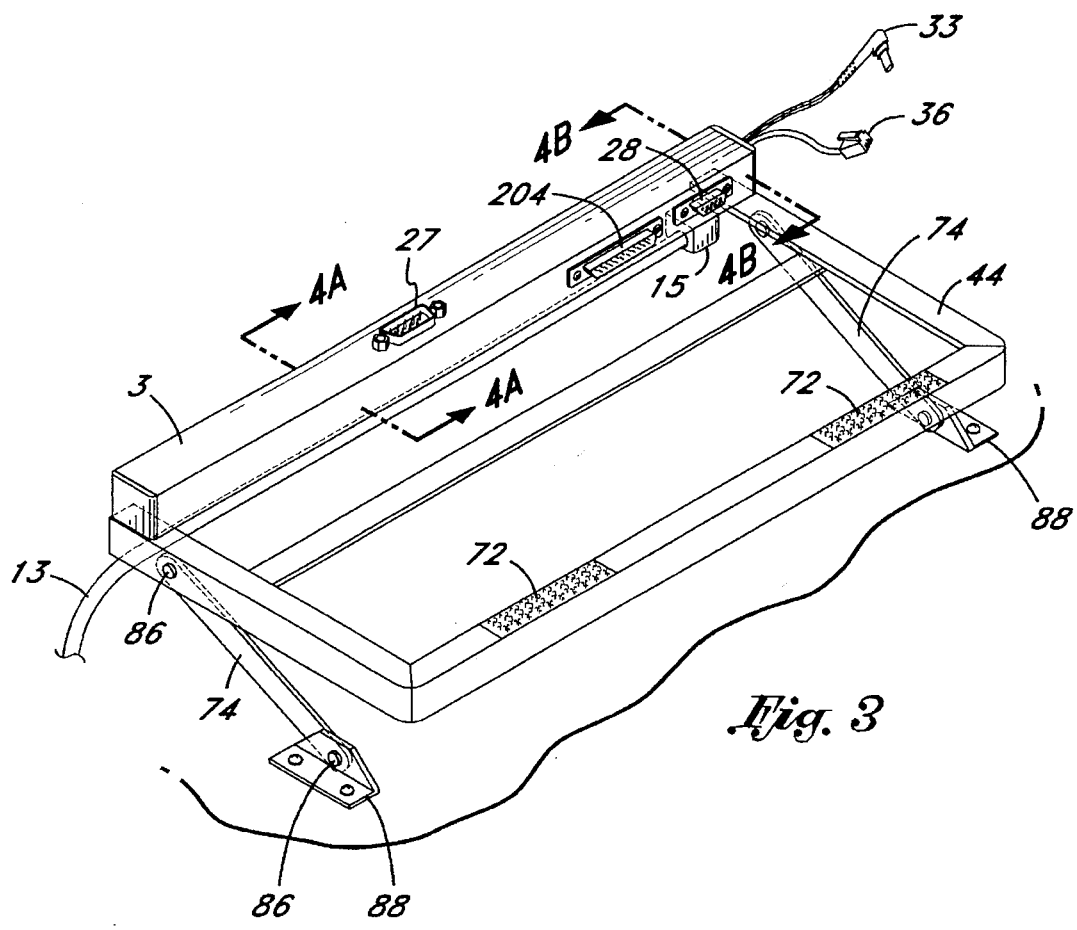
FIG. 3 is a perspective view depicting the computer tray with the docking channel.

Illustrated in FIG. 3 is a docking channel 3, preferably shaped as an elongated, hollow bar or other suitably shaped enclosure and mounted upon and anchored to the top of the computer tray 44 in order to efficiently route electric power and communication conductors to the computer 100, optional printer 200, and other peripheral devices. It should be noted that the docking channel 3 can be manufactured from a single piece of sheet metal bent to obtain a U-shaped profile, or from several pieces of sheet metal bonded together. In the embodiment illustrated in FIGS. 1–6, the docking channel 3 is secured to the computer tray 44 by means of rivets or the like. Mounted on the docking channel 3 through a plurality of openings formed therein are a corresponding plurality of electrical connectors 27, 28 and 204. The computer 100 rests upon the computer tray 44 against the docking channel 3 and is plugged into the connectors 204 and 28. Therefore, the docking channel 3 holds and secures the computer 100 on tray 44, when computer 100 and connectors 204 and 28 are mated together.

The connectors 204 and 28 are conveniently located on the docking channel 3 in facing alignment with the shroud 14, in order to allow for the usual parallel and serial ports of computer 100 to be plugged therein. The connector 204 is preferably a commercially available DB-25M connector, matching the DB-25F connector typically used for the parallel port of the computer 100, and connector 28 is preferably a commercially available DB-9F connector, matching the DB-9M connector typically used for the serial port of the computer 100. The connector 204 is also usable as a SCSI parallel adapter, not shown. Serial connector 27, known commercially as model DB-9M, is located on top of the docking channel 3, and connected at the hollow interior of the docking channel 3 to the serial connector 28. The connector 27 can be used to connect the computer 100 to the camera, scanner or any other device having a serial DB-9F connector.

It should be noted that the parallel and serial ports of the computer 100 can be located in different places for different computer models. Therefore, the connectors 204 and 28, mounted on the docking channel 3, can be relocated in different places to accommodate different computers. In the illustrated embodiment of the present invention, the connectors 204 and 28 are positioned to be coupled to an Epson 500C or Epson 4SLC computer.

A single shielded composite cable 13 is placed under the docking channel 3 to carry the electric power and communication conductors to the computer 100, printer 200 and/or other peripherals. The shielded composite cable 13 is screwed into a right angle bulk head feed-through connector 15 at the bottom of the docking channel 3 to permit easy plug-in access to cable 13. However, other kinds of connectors can be used instead of the right angle bulk head feed-through connector 15.

Figure 4A:
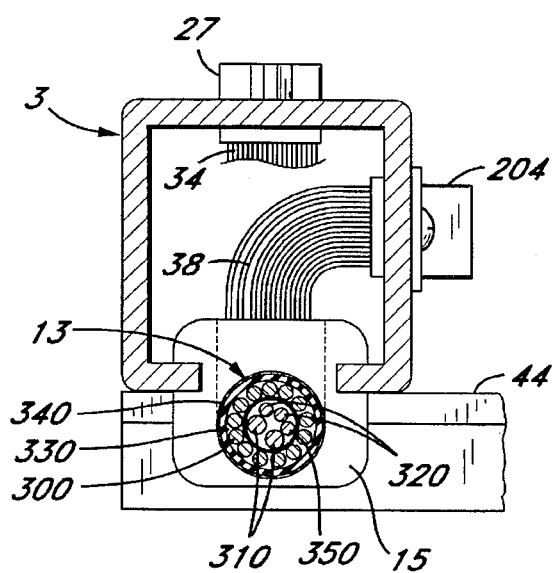
FIG. 4A is a cross-section of the docking channel taken along lines 4A—4A of FIG. 3.
Figure 4B:
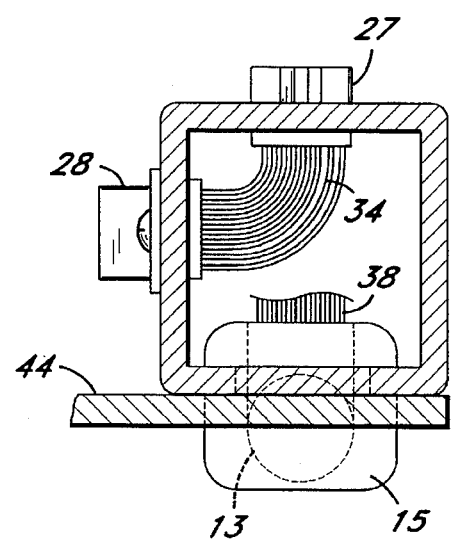
FIG. 4B is a cross-section of the docking channel taken along lines 4B—4B of FIG. 3.

Additional wiring 34 and 38, as shown in FIGS. 4A and 4B, is located at the interior of the docking channel 3 to connect the connectors 27, 28 and 204 with respective conductors carried by the shielded composite cable 13. As illustrated in FIGS. 4A and 4B, the shielded composite cable 13 carries a plurality of conductors 300 to be connected to the DB-25M parallel connector 204, two modem conductors 320 to be connected to a standard serial conductor terminating with an RJ-11 connector 36, two power conductors 310 to be connected to a conductor terminating with a power plug 33, and a conductor 350 to be grounded under the shroud 14. All of the aforementioned conductors are covered with an aluminum foil shield 330 and surrounded by an insulation jacket 340 preferably manufactured of polyvinyl chloride. Several ties, not shown, may be used to retain the shielded composite cable 13 alongside the docking channel 3.

The shroud 14 of carrying case 1 is manufactured from an electrically conductive metal (e.g., aluminum) or a lightweight plastic material covered on one surface with a thin electrically conductive foil, or painted or sprayed with a thin layer of electrically conductive film. The shroud 14 is designed as a continuous shielded housing to prevent electromagnetic emission from the power sources enclosed by the shroud 14. The power sources include the aforementioned rechargeable battery 52 and DC input receptacle 64, mounted in the body 4, and adapted for connection to an external electric power source, not shown, for energizing the computer 100 and printer 200, or for recharging the battery 52.

Several terminals extend from the shroud 14 and the docking channel 3, to be used to detachably connect the computer 100 to a source of electric power and to one or more computer peripherals located within case 1. Extending from one end of the docking channel 3 are the standard serial conductor terminating with an RJ11 connector 36 and the conductor terminating with a power plug 33. The RJ-11 connector 36 can be connected to an external RJ-11 telephone jack for external telephone input for modem or voice communications when the user does not want to use cellular telephone 54. The power plug 33 may be connected to the computer 100 or to a peripheral (e.g., a digital camera).

Extending from the shroud 14 are a power plug 41 for printer 200, a scanner or another peripheral device and a printer communication conductor having a parallel connector 51. In the illustrated embodiment of the present invention, the parallel connector 51 is a Centronix connector, although it could be any other parallel connector. A parallel DB-25F connector 65 and a 12 V DC input connector 71 extend through a vertical wall of the shroud 14 to be used for an external printer, camera or other external peripherals. It should be noted that additional short conductors and connectors can be provided, if necessary, such as connectors for an external keyboard and display.

In FIG. 2, the computer tray 44 is shown at the rear of the body 4 of carrying case 1 with the computer 100 removed therefrom. Therefore, respective electrical connectors 28 and 204 are shown disconnected from the computer 100. However, in FIG. 5, the computer 100 is shown resting on computer tray 44 to be plugged into the connectors 28 and 204 (best shown in FIG. 2).

As is best shown in FIG. 5, the computer 100 can be stacked above a printer 200, if present. The optional cellular telephone 54 can be positioned at the bottom of the body 4 of carrying case 1. An optional printer tray 46 is detachably secured to the bottom of body 4 by means of opposing complementary strips of hook and loop fastener material (e.g., VELCRO) 70 attached to opposing surfaces of printer tray 46 and body 4. The printer 200 rests upon the printer tray 46, and, with the cover 2 of carrying case 1 in the closed position as shown in FIG. 5, the lid 202 of printer 200 is correspondingly closed atop the printer 200. Printer 200 also includes the usual data connector 206 at one side thereof to be interfaced with the computer 100 via the printer parallel connector 51, shown in FIG. 3.

However, as previously mentioned, the present invention can be used without the printer tray 46, in which case the printer 200 rests directly on the bottom of body 4. In this case, the printer 200 is detachably secured to the bottom of body 4 by means of opposing complementary strips of hook and loop fastener material (e.g., VELCRO) 70 attached to opposing surfaces of printer 200 and the body 4. With the cover 2 of carrying case 1 closed, the computer tray 44 is arranged in spaced parallel alignment above the printer 200 or printer tray 46. The computer 100 is detachably connected to the computer tray 44 by means of opposing complementary strips of hook and loop fastener material (e.g. VELCRO) 72 attached to opposing surfaces of computer tray 44 and computer 100.

Computer 100 rests upon the computer tray 44 with the lid 102 thereof closed atop the computer keyboard, not shown. The computer tray 44 is interconnected with the printer tray 46 by a pair of arms 74, shown in FIGS. 3, 5 and 6. The computer tray 44 may be advanced forwardly of printer tray 46 and out of body 4, when the cover 2 of carrying case 1 is opened and rotated away from the body 4. The arms 74 are adapted to rotate at end screws 86 and brackets 88 to permit the computer tray 44 to be simultaneously tilted and moved forward or backwards from retracted to advanced positions over the body 4 of carrying case 1, so that the computer 100 will be correspondingly moved into and out of vertical alignment with the printer 200.

By virtue of the disclosed invention, a shielded compact modular portable work station, including a computer, printer and other peripherals, may be efficiently packaged within and controlled entirely from a carrying case. The addition of docking channel 3 permits power and communication conductors to be efficiently routed to the computer and the computer peripherals to enhance the modular nature of the carrying case and reduce space consumption by avoiding the numerous cable paths common to conventional portable work stations. Since the computer and peripheral devices are conventional, the details thereof have been omitted. Nevertheless, and for purposes of illustration only, the computer 100 may be a commercially available 100 MHz Pentium notebook personal computer with a 420 MB hard drive. The digital camera is available from Dycam Corporation. The cellular telephone 54 is available from Motorola Corporation. The printer 200 may be a Bubble Jet Printer available from Canon Corporation. Moreover, the carrying case 1 is a hard shell case available from Samsonite Corporation.

It will be apparent that while a preferred embodiment of the invention has been shown and described, various modifications and changes may be made without departing from the true spirit and scope of the invention. For example, although there has been illustrated a single docking channel affixed to a single tray for carrying a computer, it is within the scope of this invention to include an additional tray, placed above or below the computer tray, for carrying a computer peripheral and having an additional docking channel affixed thereto for routing the appropriate power and communication conductors for such peripheral.

What is claimed is:

1. A modular portable work station including a carrying case and a computer and at least one computer peripheral transported within the carrying case, said carrying case having a body and a cover movable to opened and closed positions relative to the body, said work station comprising;

a source of electric power;

electric cable means to connect said source of electric power to each of said computer and said at least one computer peripheral;

channel means located within said carrying case body to receive and support said computer thereagainst;

at least one first and at least one second electrical connector mounted on said channel means; and means by which to electrically couple said electrical cable means to said at least one first and second electrical connectors;

said computer having a power terminal that is adapted to be plugged into and received by said at least one first electrical connector, and said at least one computer peripheral adapted to be interconnected to said at least one second electrical connector.

2. The portable work station recited in claim 1, wherein said at least one computer peripheral is a printer.

3. The portable work station recited in claim 1, further comprising a computer tray located within said carrying case body so as to be able to support said computer, said channel means fixedly attached to said computer tray.

4. The portable work station recited in claim 3, further comprising means to move said computer tray relative to said carrying case body.

5. The portable work station recited in claim 1, wherein said channel means is an elongated, hollow enclosure to accommodate said electric cable means therewithin, said channel means including a plurality of openings to receive said at least one first electrical connector, said at least one second electrical connector and said means by which to couple said electric cable means to said at least one first and second electrical connectors.

6. The portable work station recited in claim 1, wherein said electric cable means is a shielded composite cable comprising a plurality of conductors to provide electrical power and communication signals to said computer and said at least one computer peripheral.

7. The portable work station recited in claim 6, further comprising a first set of terminals electrically connected to respective ones of said plurality of conductors of said shielded composite cable, said first set of terminals to be connected to said computer and said at least one computer peripheral to provide electrical power and communication signals thereto.

8. The portable work station recited in claim 1, wherein said at least one first electrical connector adapted to be attached to said computer is a parallel male connector.

9. The portable work station recited in claim 1, wherein said at least one first electrical connector adapted to be attached to said computer is a serial female connector and said at least one second electrical connector adapted to be attached to said at least one computer peripheral is a serial male connector, said channel means including means for connecting said at least one first electrical connector to said at least one second electrical connector.

10. The portable work station recited in claim 1, wherein said means by which to couple said electric cable means to the at least one first and the at least one second electrical connectors extends at a right angle from said channel means so that said channel means is able to support said electric cable means.

11. The portable work station recited in claim 1, further comprising a shroud extending across the body of said carrying case and a cellular telephone located within said shroud, wherein said shroud is fabricated from an electrically conducting material in order to shield said computer and said at least one computer peripheral from RF signals emitted by the cellular telephone.

12. The portable work station recited in claim 11, wherein said source of electric power is a battery located within said shroud.

13. The portable work station recited in claim 11, further comprising a second set of terminals electrically connected to said electric cable means and said source of electric power within said shroud to provide electrical power and communication signals to said computer and said at least one computer peripheral.

14. The portable work station recited in claim 11, further comprising a parallel female connector and a 12 V DC power input connector mounted on said shroud to respectively connect said computer and said at least one computer peripheral to said source of electric power by way of said electric cable means.

15. The portable work station recited in claim 11, further comprising a main control panel located on said shroud and having a plurality of manually operable switches, said switches being selectively operated to respectively connect said computer and said at least one computer peripheral to said source of electric power by way of said electric cable means.

16. A modular portable work station including a carrying case and a computer, a printer and at least one computer peripheral transported within the carrying case, said carrying case having a body and a cover movable to opened and closed positions relative to the body, said work station comprising;

a source of electric power;

electric cable means to connect said source of electric power to each of said computer and said at least one computer peripheral;

a computer tray located within said carrying case body to support the computer thereon;

a channel attached to said computer tray;

means by which to move said computer tray and said channel attached thereto relative to said carrying case body;

at least one first and at least one second electrical connector mounted on said channel means; and means by which to electrically couple said electric cable means to said at least one first and second electrical connectors;

said at least one first electrical connector adapted to be attached to said computer and said at least one second electrical connector adapted to be attached to said at least one computer peripheral.

17. The portable work station recited in claim 16, further comprising a shroud extending across the body of said carrying case and a cellular telephone located within said shroud, wherein said shroud is fabricated from an electrically conducting material in order to shield said computer and said at least one computer peripheral from RF signals emitted by the cellular telephone.

18. The portable work station recited in claim 16, wherein said channel is an elongated, hollow enclosure to accommodate said electric cable means therewithin and to receive and support said computer thereagainst, said channel means including a plurality of openings to respectively receive therethrough said at least one first electrical connector, said at least one second electrical connector and said means by which to couple said electric cable means to said at at least one first and second electrical connectors.

19. The portable work station recited in claim 16, wherein said electric cable means is a shielded composite cable comprising a plurality of conductors to be connected to said computer and said at least one computer peripheral to provide electrical power and communication signals thereto.

20. The portable work station recited in claim 19, further comprising a set of terminals electrically connected to respective ones of said plurality of conductors of said shielded composite cable, said set of terminals to be connected to said computer and said at least one computer peripheral to provide electrical power and communication signals thereto.

* * * * *